(12) United States Patent
Lin et al.

(10) Patent No.: US 10,173,755 B2
(45) Date of Patent: Jan. 8, 2019

(54) FLOATING AND MOBILE CARRYING PLATFORM DEVICE AND METHOD OF USING THE SAME

(71) Applicant: Dalian University of Technology, Dalian (CN)

(72) Inventors: Yan Lin, Dalian (CN); Chao Ye, Dalian (CN); Xiaoning Jiang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 15/871,034

(22) Filed: Jan. 14, 2018

(65) Prior Publication Data

US 2018/0134348 A1 May 17, 2018

Related U.S. Application Data

(63) Continuation-in-part of application No. PCT/CN2016/094045, filed on Aug. 9, 2016.

(30) Foreign Application Priority Data

Sep. 28, 2015 (CN) .......................... 2015 1 0624418

(51) Int. Cl.
  *B63B 35/28* (2006.01)
  *B63B 35/44* (2006.01)
  (Continued)

(52) U.S. Cl.
  CPC .......... *B63B 35/28* (2013.01); *B63B 17/0027* (2013.01); *B63B 35/44* (2013.01); *F16K 15/20* (2013.01); *B63B 2017/0054* (2013.01)

(58) Field of Classification Search
  CPC .................................................... B63B 35/285
  (Continued)

(56) References Cited

U.S. PATENT DOCUMENTS 4,085,695 A * 4/1978 Bylo ......................... B63B 3/08
  114/260
4,429,654 A 2/1984 Smith, Sr.
  (Continued)

FOREIGN PATENT DOCUMENTS

CN 201309577 Y 9/2009
CN 103910044 A 7/2014
  (Continued)

*Primary Examiner* — Lars A Olson
*Assistant Examiner* — Jovon E Hayes
(74) *Attorney, Agent, or Firm* — Matthias Scholl P.C.; Matthias Scholl

(57) ABSTRACT

A floating and mobile carrying platform device, including: a load-bearing deck trunk including an upper surface and a lower surface; a semi-submersible tower disposed on the upper surface of the load-bearing deck trunk; a column-type buoyancy pier connected to the lower surface of the load-bearing deck trunk; rest piers disposed on the upper surface of the load-bearing deck trunk; a console disposed in the semi-submersible tower; a slideway disposed on the upper surface of the load-bearing deck trunk; and a connection member disposed between the load-bearing deck trunk and the semi-submersible tower. The load-bearing deck trunk adopts a box structure, and the box structure includes a top plate, a bottom plate, side plates, a plurality of cross rib plates, and vent holes. The plurality of cross rib plates is disposed between the top plate and the bottom plate to support the top plate.

7 Claims, 13 Drawing Sheets

(51) Int. Cl.
*B63B 17/00* (2006.01)
*F16K 15/20* (2006.01)

(58) Field of Classification Search
USPC .......................................................... 114/44
See application file for complete search history.

(56) References Cited

U.S. PATENT DOCUMENTS

| | | | | |
|---|---|---|---|---|
| 6,435,773 | B1 * | 8/2002 | Khachaturian | ......... B63B 9/065 |
| | | | | 405/202 |
| 6,443,660 | B1 * | 9/2002 | Smith | ....................... B63C 7/02 |
| | | | | 114/244 |
| 6,834,604 | B2 * | 12/2004 | O'Neil | ...................... B63C 1/02 |
| | | | | 114/44 |
| 7,854,570 | B2 * | 12/2010 | Heidari | ................... B63B 1/107 |
| | | | | 114/264 |
| 2004/0037651 | A1 * | 2/2004 | Khachaturian | ......... B63B 9/065 |
| | | | | 405/203 |
| 2014/0366792 | A1 * | 12/2014 | Steven | .................. B63B 35/003 |
| | | | | 114/72 |
| 2015/0210362 | A1 | 7/2015 | Ruiz Diez | |
| 2018/0134348 | A1 * | 5/2018 | Lin | ......................... B63B 35/28 |

FOREIGN PATENT DOCUMENTS

| | | |
|---|---|---|
| CN | 203902802 U | 10/2014 |
| WO | 9912806 A1 | 3/1999 |
| WO | 2014001717 A1 | 1/2014 |

\* cited by examiner

FLOATING AND MOBILE CARRYING PLATFORM DEVICE AND METHOD OF USING THE SAME

CROSS-REFERENCE TO RELATED APPLICATIONS

This application is a continuation-in-part of International Patent Application No. PCT/CN2016/094045 with an international filing date of Aug. 9, 2016, designating the United States, and further claims foreign priority benefits to Chinese Patent Application No. 201510624418.4 filed Sep. 28, 2015. The contents of all of the aforementioned applications, including any intervening amendments thereto, are incorporated herein by reference.

BACKGROUND OF THE INVENTION

Field of the Invention

The disclosure relates to a floating and mobile carrying platform device and a method of using the same.

Description of the Related Art

With the advancement of offshore production and marine research, conventional operation modes for land-sea connection transportation, installation and construction of offshore equipment, and rescue operation face new challenges.

Conventional semi-submersible barges are costly, heavy in weight, and subject to waves and winds. This leads to low structural stability and reliability.

SUMMARY OF THE INVENTION

In order to overcome the problems of existing carrying platform devices, one objective of the disclosure is to provide a floating and mobile carrying platform device that is strong in wind and wave resistance, highly stable and reliable, and easy to operate and maintain.

To achieve the above objectives, in accordance with one embodiment of the invention, there is provided a floating and mobile carrying platform device, comprising: a load-bearing deck trunk comprising an upper surface and a lower surface; a semi-submersible tower disposed on the upper surface of the load-bearing deck trunk; a column-type buoyancy pier connected to the lower surface of the load-bearing deck trunk; rest piers disposed on the upper surface of the load-bearing deck trunk; a console disposed in the semi-submersible tower; a slideway disposed on the upper surface of the load-bearing deck trunk; and a connection member disposed between the load-bearing deck trunk and the semi-submersible tower. The load-bearing deck trunk adopts a box structure, and the box structure comprises a top plate, a bottom plate, side plates, a plurality of cross rib plates, and vent holes; each of the plurality of cross rib plates comprises a lightening hole; the plurality of cross rib plates is disposed between the top plate and the bottom plate to support the top plate; the vent holes are disposed at joints of every two adjacent cross rib plates and pass through the top plate and bottom plate; or, the load-bearing deck trunk adopts an open-type grillage structure comprising a top plate and lattice trusses adapted to support the top plate; the top plate is equipped with a water hole; the rest piers are disposed on the top plate, and are located at cross points of the cross rib plates or at cross points of grids of the lattice trusses; the column-type buoyancy pier is connected to the lower surface of the load-bearing deck trunk, and comprises a stabilizer fin, a drain valve and an air valve; the stabilizer fin is disposed on a side wall of the column-type buoyancy pier; a cross section of the column-type buoyancy pier is wing-shaped or shuffle-shaped; the semi-submersible tower is disposed on the upper surface of the load-bearing deck trunk, and comprises an inflation valve, a cabin door, a ladder, a safety deck, and an air tank; the ladder connects the cabin door and the safety deck; and the console and the air tank are disposed on the safety deck, and the console is configured to control the drain valve, the air valve, and the inflation valve; and the air tank is connected to the air valve and the inflation valve via a compressed air pipeline.

In a class of this embodiment, the connection member is of a rigid pipe structure, and a cross section thereof is circular or square.

In a class of this embodiment, the connection member is of a flexible stay rope structure.

In accordance with another embodiment of the disclosure, there is provided a method for using the floating and mobile carrying platform device, the method comprising:
1) towing the platform device or a to-be-carried structure to an operating location;
2) opening, under the control of the console, the drain valve and air valve, and allowing the platform device to sink to a certain water level;
3) closing, under the control of the console, the drain valve and air valve; continuing towing the platform device right below the to-be-carried structure or towing the to-be-carried structure right above the platform device;
4) opening, under the control of the console, the drain valve and air valve, and pumping compressed air prestored in the air tank into the air valve via the compressed air pipeline to discharge ballast water;
5) allowing the platform device to float upwards, and dropping the to-be-carried structure on the slideway of the platform device; and
6) closing, under the control of the console, the drain valve and the air valve, and adjusting a height of the rest piers to allow the to-be-carried structure to drop on the rest piers.

In a class of this embodiment, the method further comprises charging the air tank in need thereof, and the charging the air tank comprises: opening, under the control of the console, an inflation valve of the semi-submersible tower, and then charging the air tank via a compressed air source or a charging pipe of a working ship.

In accordance with still another embodiment of the disclosure, there is provided a method for using the floating and mobile carrying platform device, the method comprising:
1) docking the platform device beside a wharf having a slideway;
2) opening, under the control of the console, the drain valve and air valve, and adjusting the platform device to be in the same height as the slideway of the wharf;
3) closing, under the control of the console, the drain valve and air valve; allowing the to-be-carried structure to slide on the slideway of the platform device via the slideway of the wharf;
4) opening, under the control of the console, the drain valve and air valve, and pumping compressed air prestored in the air tank into the air valve via the compressed air pipeline to discharge ballast water;
5) allowing the platform device to float upwards, and dropping the to-be-carried structure on the slideway of the platform device; and 6) closing, under the control of the console, the drain valve and the air valve, and adjusting a height of the rest piers to allow the to-be-carried structure to drop on the rest piers.

In a class of this embodiment, the method further comprises charging the air tank in need thereof, and the charging the air tank comprises: opening, under the control of the console, an inflation valve of the semi-submersible tower, and then charging the air tank via a compressed air source or a charging pipe of a working ship.

As compared with conventional semi-submersible barges and other transportation devices, the floating and mobile carrying platform device provided by the disclosure has relatively light self-weight under the same bearing capacity. Meanwhile, as compared with large waterplane carrying devices, the main structure of the platform device is located over the water surface, which ensures the device is subject to a small bending moment in the wind wave thus improving the platform stability and reliability. The arrangement of the buoyancy pier based on a special section design ensures small towing resistance and good revolution, and meanwhile carrying tasks under collocation of various volumes and weights can be matched through adjustment of section sizes; the design of stabilizer fin on the buoyancy pier ensures stable towing; the waterborne structure is light, and subject to small wind area, thereby reducing weight of steel materials on the platform and lowering construction cost; the air valve and drain valve design facilitate the upward floating and sinking of the platform; four semi-submersible towers on the buoyancy piers increase primary stability and strong continuity of the platform; this platform can complete various carrying tasks as long as the compressed air source is supplemented on corresponding wharfs, and is a reliable, economic and efficient carrying platform.

The platform device of the disclosure has the beneficial effects as follows: the floating and mobile carrying platform device comprises a column-type buoyancy pier, a semi-submersible tower, a load-bearing deck trunk, a slideway, rest piers, a stabilizer fin, a connection member and a console. The platform device is submersible type offshore carrying equipment, capable of sinking, lifting, carrying, and butting joint with shore tracks by artificially adjusting the amount of ballast water in the column-type buoyancy piers through a submersible control member, so the device is simple and easy to manipulate. The platform device is light and safe; the main body of the platform device is located over the water surface when in working condition thus reducing the bending moments of waves; the column-type buoyancy piers reduce towing resistance; the stabilizer fin disposed on the column-type buoyancy piers increase towing stability; the design of the waterborne semi-submersible tower reduces the wind area and improves the primary stability. As compared with the traditional carrying barge, the tower column type structure of the platform device is capable of bearing a more large-sized offshore structure, and is more economic, efficient and strong in engineering application.

In drawings, 1. load-bearing deck trunk; 1a. rest pier; 1b. water hole; 1c. cross rib plate; 1d. lattice truss; 1e. top plate; 1f. bottom plate; 1g. side plate; 1h. lightening hole; 1i. vent hole; 2. column-type buoyance pier; 2a. drain valve; 2b. stabilizer fin; 2c. air valve; 3. slideway; 4. semi-submersible tower; 4a. cabin door; 4b. ladder; 4c. safety deck; 4d. console; 4e. air tank; 4f. compressed air pipeline; 4g. external aerating valve; 5. connection member; 6. to-be-carried structure; 7. cable connected to a tugboat; 8. wharf; 8a. wharf slideway; 9. working ship; 9a. charging pipe.

DETAILED DESCRIPTION OF THE EMBODIMENTS

For further illustrating the invention, experiments detailing a floating and mobile carrying platform device are described below.

Figure 1:
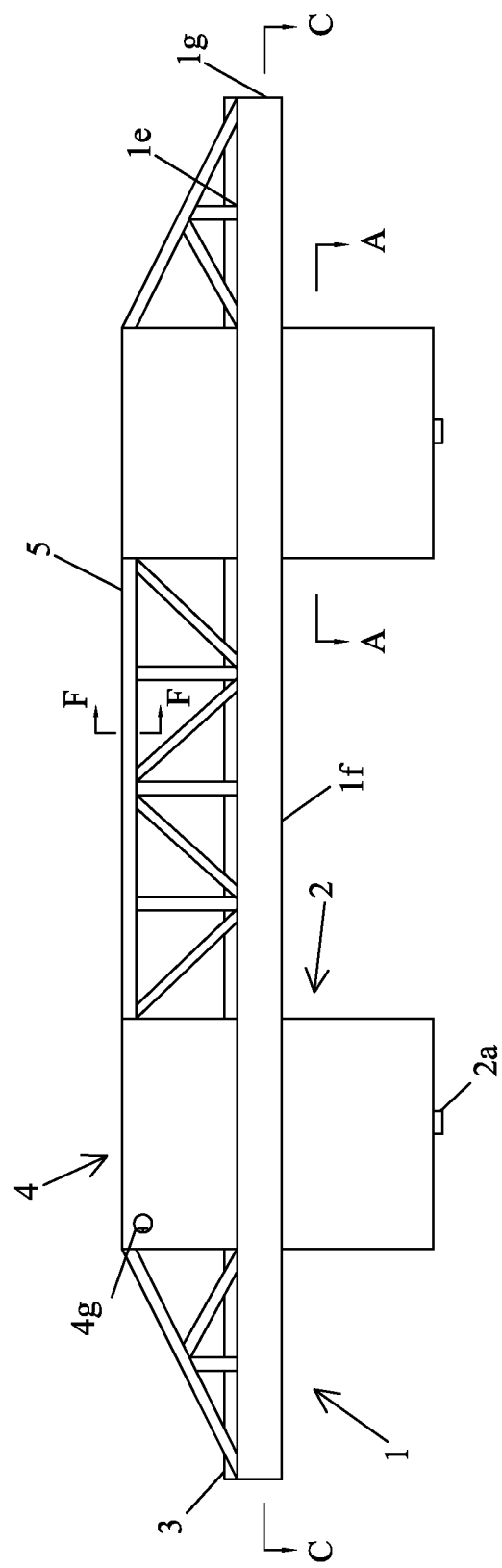
FIG. 1 is a front view of a floating and mobile carrying platform device in a first embodiment of the disclosure.
Figure 2:
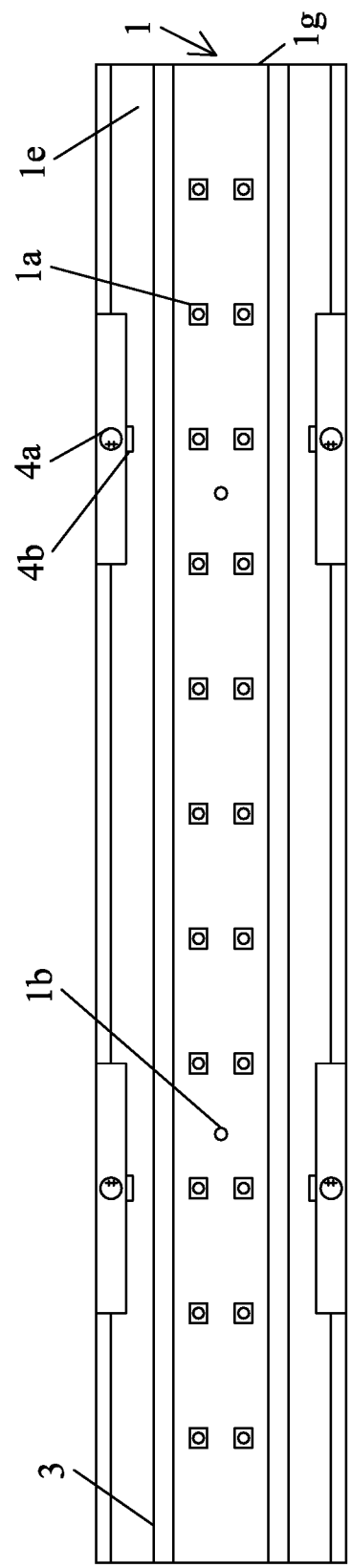
FIG. 2 is a top view of a floating and mobile carrying platform device in a first embodiment of the disclosure.
Figure 3:
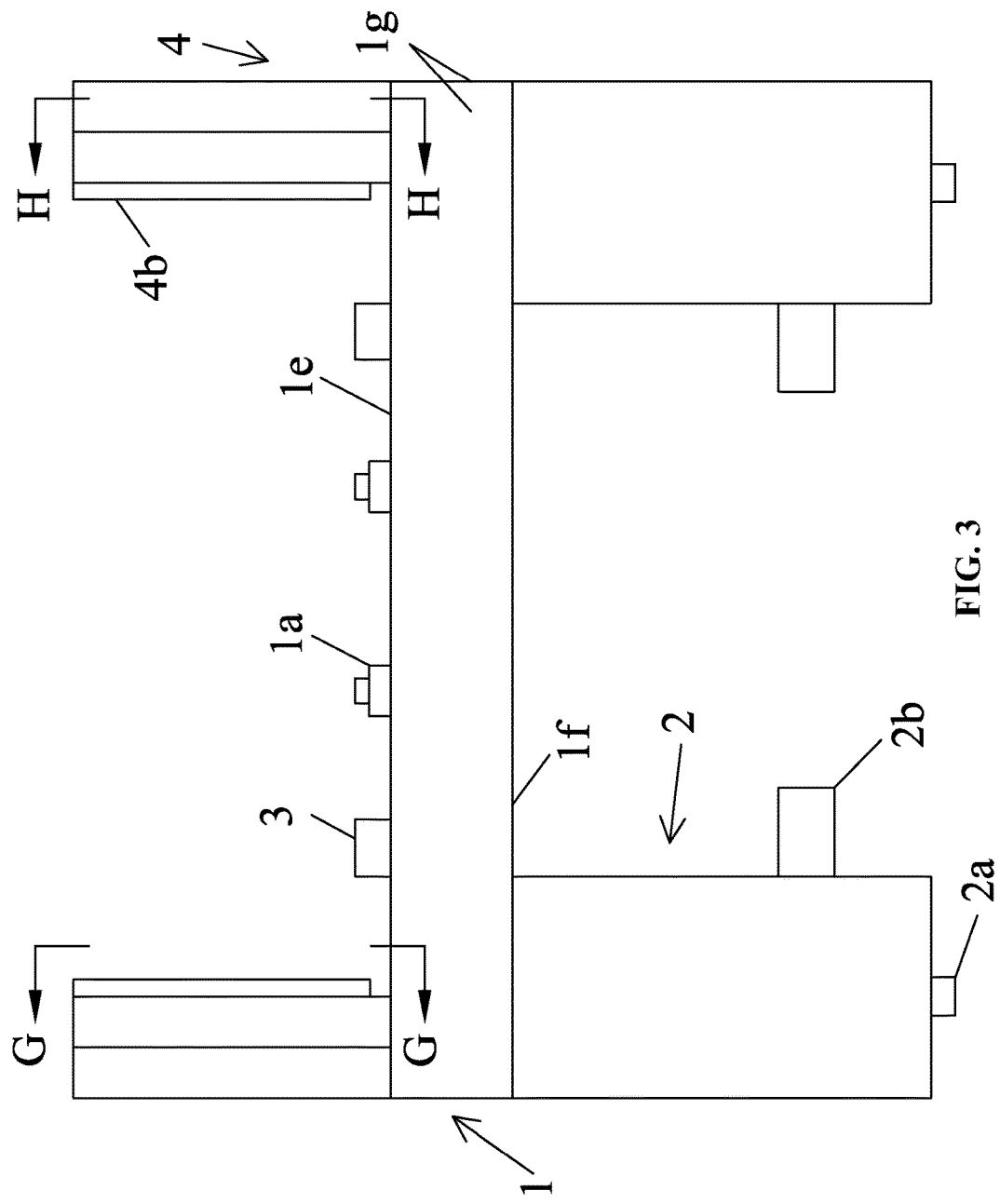
FIG. 3 is a left view of a floating and mobile carrying platform device in a first embodiment of the disclosure.

FIGS. 1, 2 and 3 illustrate a floating and mobile carrying platform device in a first embodiment. The platform device comprises a column-type buoyancy pier 2, a semi-submersible tower 4, a load-bearing deck trunk 1, a slideway 3, rest piers 1a, a stabilizer fin 2b, a connection member 5 and a console 4d. The load-bearing deck trunk 1 is of a box structure, in which cross rib plates 1c are used as a framework supporting a top plate 1e, a bottom plate 1f and side plates 1g. Thus, the load-bearing deck trunk is a main carrier of a to-be-carried structure 6 under different working conditions. The top plate 1e of the deck trunk is provided with rest piers 1a, the slideway 3, and water holes 1b. The bottom plate 1f is also provided with the water holes 1b. The slideway 3 can be utilized as a temporary bearing member during specific working, and then the rest piers 1a jack up to bear the weight, which is conducive to improving the carrying stability. The truss type connection member 5 adopts a round pipe structure and connects the load-bearing deck trunk 1 and the semi-submersible tower 4, it is made of light-weight material. The connection member ensures the continuity and the structural strength of the entire structure;

the column-type buoyance piers 2 and the semi-submersible tower 4 are in periphery symmetrical distribution centered on the load-bearing deck trunk 1 and are used for providing a buoyancy for the entire platform so that the platform device can complete various operations. The section forms of the column-type buoyance piers 2 are beneficial to reducing towing resistance, the inflation valve 4g are disposed outside the semi-submersible tower 4 and used for connecting an external aerating source, and the entire tower can ensure the buoyancy and the primary stability of the platform device.

Figure 4:
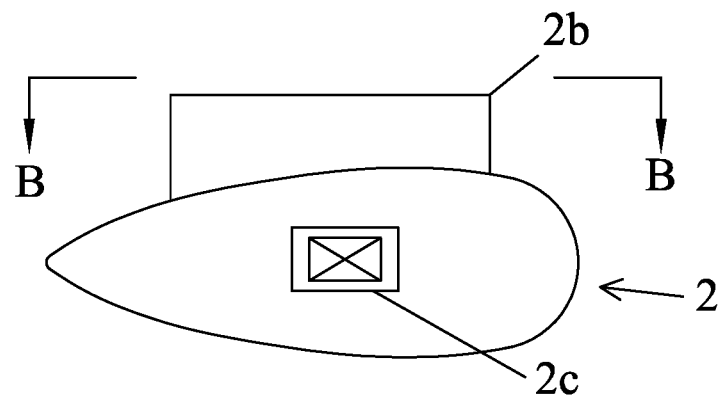
FIG. 4 is a sectional view taken from line A-A in FIG. 1, namely, a first sectional view of a column-type buoyancy pier.
Figure 5:
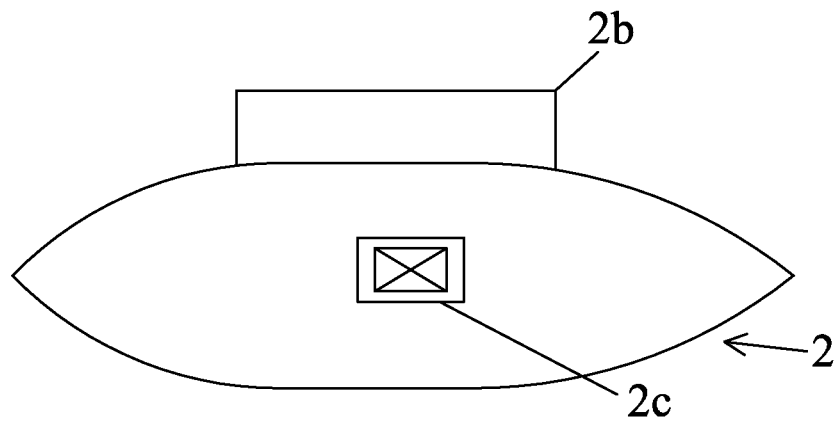
FIG. 5 is a second sectional view of a column-type buoyancy pier.
Figure 6:
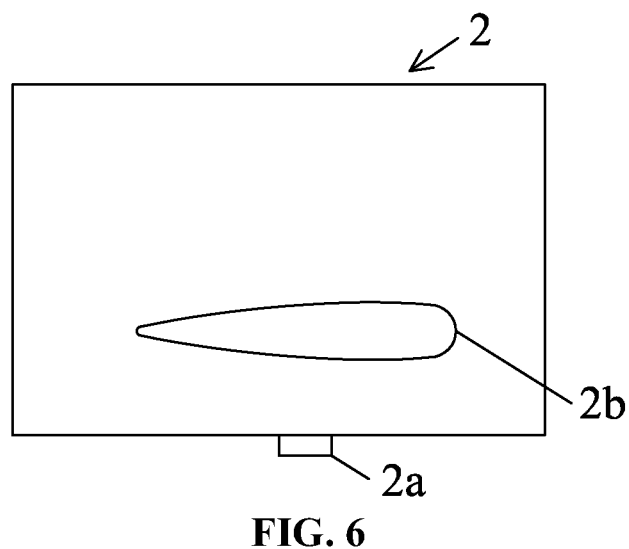
FIG. 6 is a sectional view taken from line B-B in FIG. 4.

FIGS. 4, 5 and 6 illustrate specific forms of the column-type buoyance piers 2 which are of a wing shape or a spindle type. FIG. 4 shows a wing-shaped section, FIG. 5 shows a spindle-type section on which the drain valves 2a, the air valves 2c and the stabilizer fin 2b are provided. The air valves 2c are disposed on the upper parts of the column-type buoyance piers 2 and used for pumping in compressed air so that the ballast water in the piers is discharged and the platform device upwardly floats. The drain valves 2a and the air valves 2c are controlled by the console 4d; the stabilizer fin 2b is of a wing shape, and a lift force generated in the towing process ensures the towing stability of the platform device.

Figure 7:
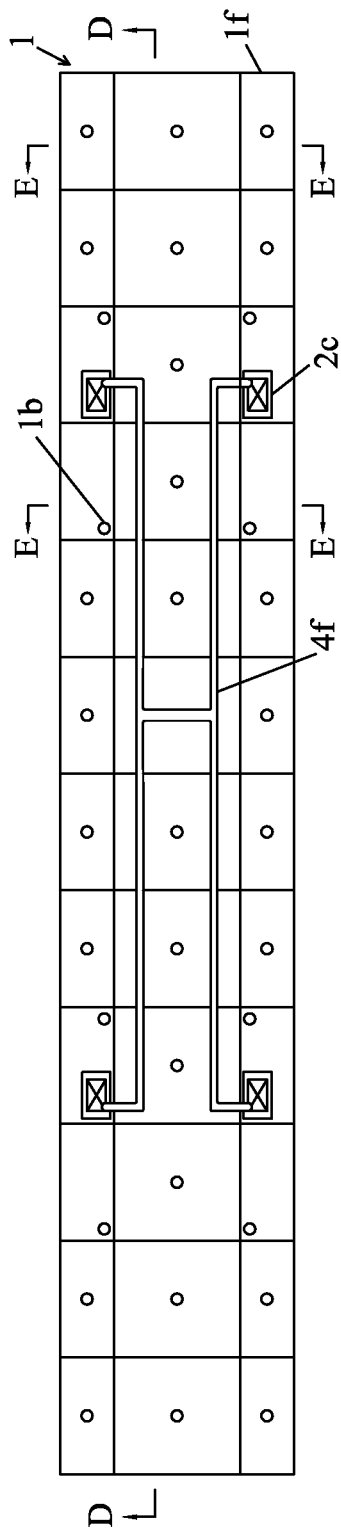
FIG. 7 is a sectional view taken from line C-C in FIG. 1.
Figure 8:
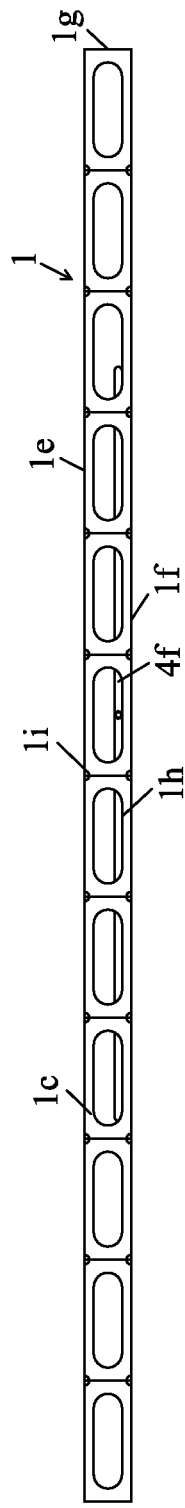
FIG. 8 is a sectional view taken from line D-D in FIG. 6.
Figure 9:
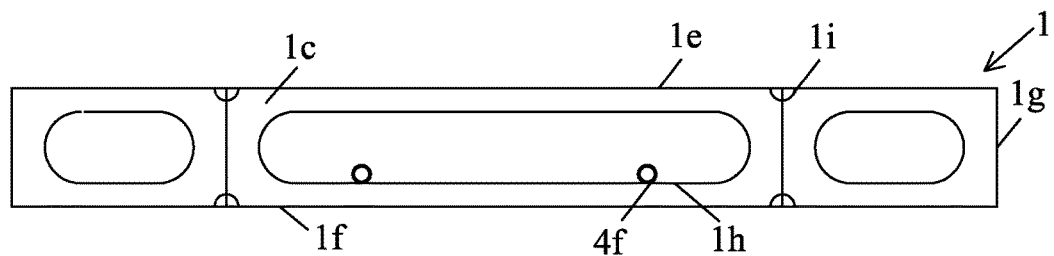
FIG. 9 is a sectional view taken from line E-E in FIG. 6.

FIGS. 7, 8 and 9 illustrate an internal structure of the load-bearing deck trunk 1. A plurality of drainage holes 1b is disposed on the upper and lower surfaces of the load-bearing deck trunk 1 ensuring the internal water flow is smooth. Meanwhile, the cross rib plates 1c are provided with the lightening holes 1h and the vent holes 1i, so the entire structure is light and safe. Furthermore, the compressed air pipelines 4f are disposed in the lightening holes 1h and used for charging compressed air from the semi-submersible tower 4 to the column-type buoyancy piers 2.

Figure 10:
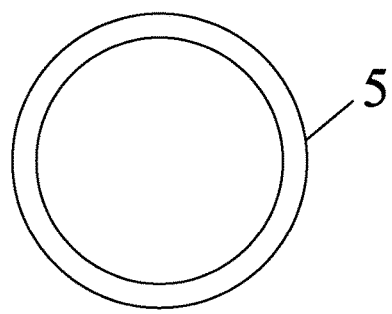
FIG. 10 is a sectional view taken from line F-F in FIG. 1, namely, a first sectional view of a connection member.
Figure 11:
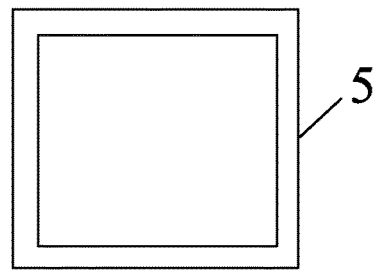
FIG. 11 is a second sectional view of a connection member.

FIGS. 10 and 11 illustrate a sectional view of a connection member 5, FIG. 10 shows a section form of a round pipe, and FIG. 11 shows a section form of a square pipe.

Figure 12:
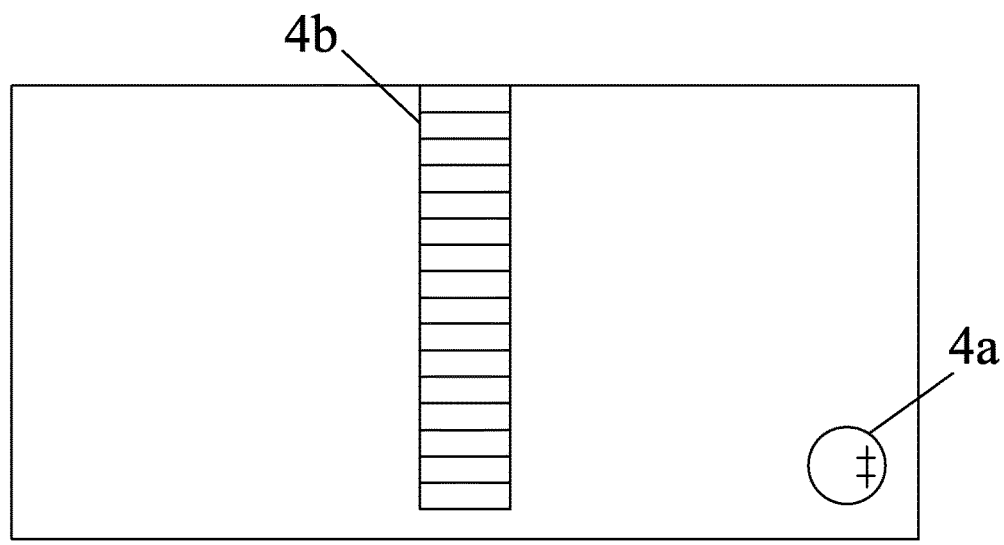
FIG. 12 is a sectional view taken from line G-G in FIG. 3.
Figure 13:
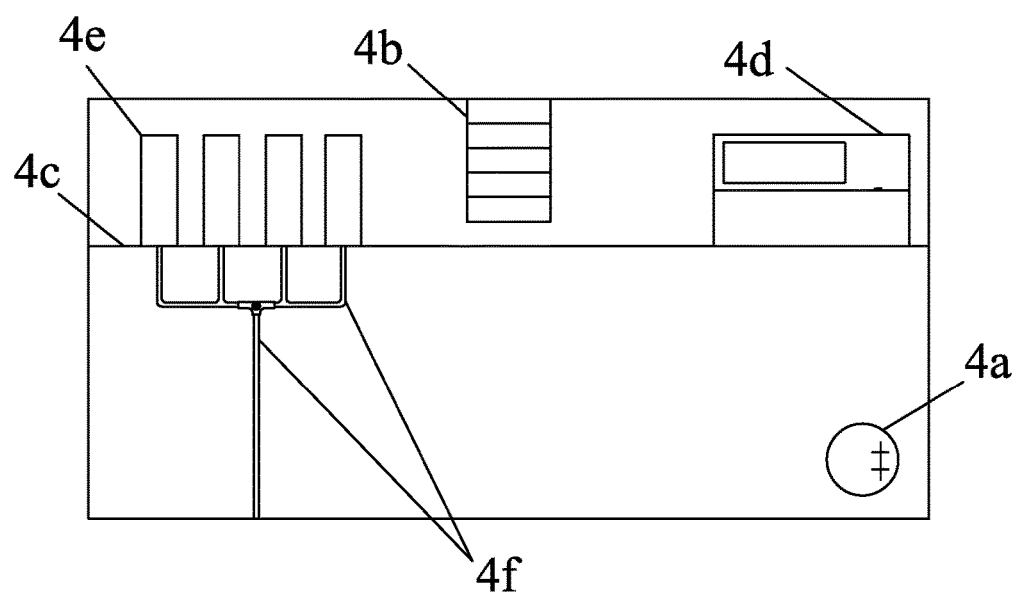
FIG. 13 is a sectional view taken from line H-H in FIG. 3.

FIGS. 12 and 13 illustrate a sectional view of a semi-submersible tower 4 inside which the safety decks 4c are higher than the water surface under any working conditions, the console 4d and the air tanks 4e are disposed on the safety decks 4c, the compressed air pipelines 4f are disposed under the safety decks 4c and used for connecting the air tanks 4e, the tops and the bottoms of the semi-submersible tower 4 are both provided with the cabin doors 4a used for personnel to enter the insides of the towers to perform maintenance and inspection, the ladders 4b are used for connecting various places which are accessible, and the semi-submersible tower 4 ensure the primary stability and the strength continuity of the platform device.

Figure 14:
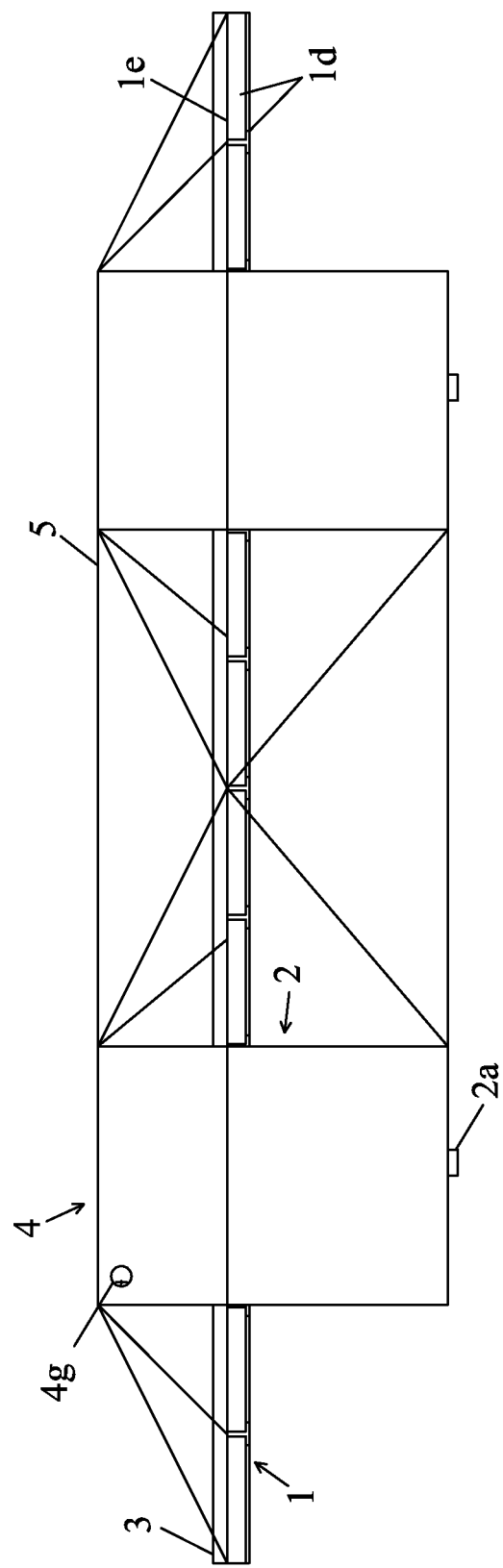
FIG. 14 is a front view of a floating and mobile carrying platform device in a second embodiment of the disclosure.
Figure 15:
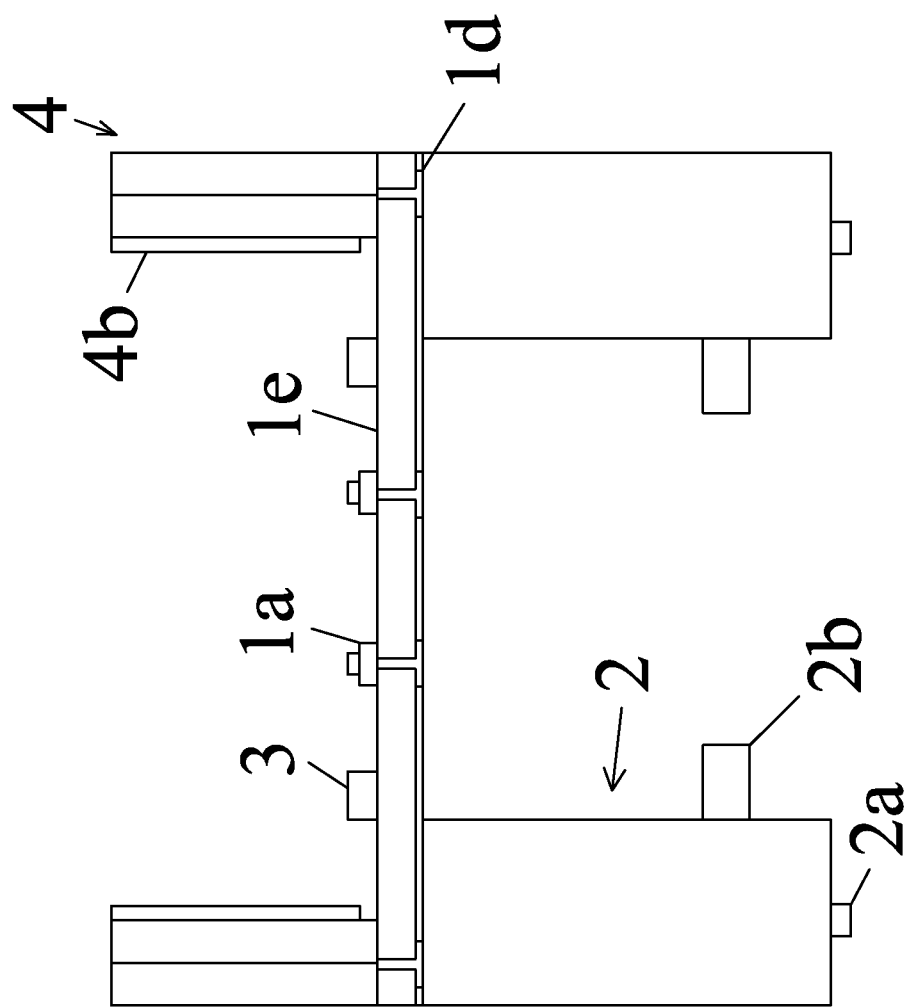
FIG. 15 is a left view of a floating and mobile carrying platform device in a second embodiment of the disclosure.

FIGS. 14 and 15 illustrate a floating and mobile carrying platform device in a second embodiment. The load-bearing deck trunk 1 adopts lattice trusses 1d to support the top plate 1e, thereby reducing the weight to a greater extent; the connection member 5 adopts a flexible stay rope member which respectively connects the top plate 1e, the semi-submersible tower 4 and the column-type buoyance piers 2 to prevent generation of a hogging or sagging phenomenon in a single-layer deck, and the entire combination makes the structure lighter and improves the bearing capability thereof.

Figure 16:
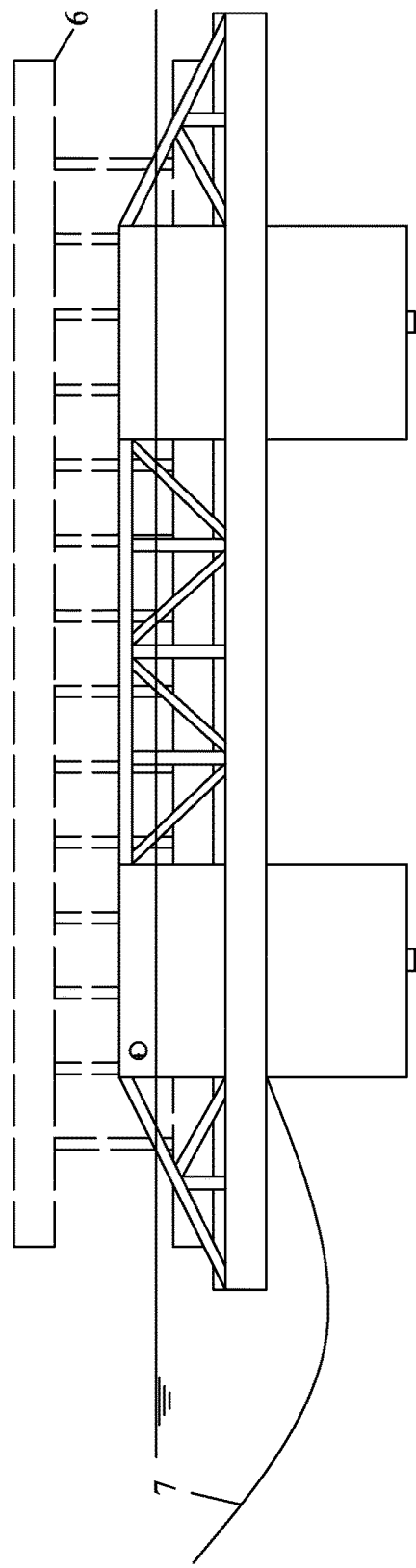
FIG. 16 is a first carrying state diagram of a floating and mobile carrying platform device of the disclosure.

FIG. 16 illustrates a first working state of a floating and mobile carrying platform device. The console 4d controls the drain valves 2a and the air valves 2c to close, then the platform is towed right below the carrying structure 6 or the carrying structure 6 is towed right above the platform through a cable 7 connecting to the tugboat. The console 4d controls the drain valves 2a and the air valves 2c to open, and compressed air prestored in the air tanks 4e is pumped into the air valves 2c via the compressed air pipelines 4f. Thereafter, the ballast water is discharged, the platform upwardly floats, and the to-be-carried structure 6 drops on the slideway 3. The console 4d controls the drain valves 2a and the air valves 2c to close, the heights of the rest piers 1a are adjusted, and the to-be-carried structure 6 drops on the rest piers 1a.

Figure 17:
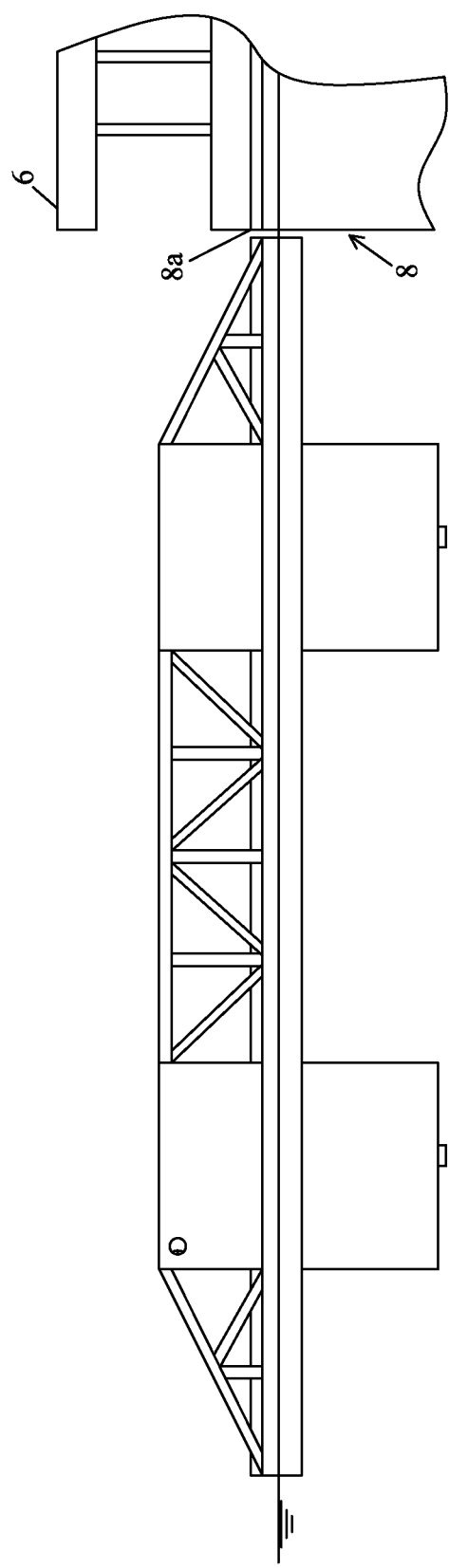
FIG. 17 is a second carrying state diagram of a floating and mobile carrying platform device of the disclosure.

FIG. 17 illustrates a second working state of a floating and mobile carrying platform device. First, the platform is docked beside the wharf 8, the console 4d controls the drain valves 2a and the air valves 2c to open, and the platform is adjusted to the same height as that of the wharf slideway 8a. The console 4d controls the drain valves 2a and the air valves 2c to close, then the to-be-carried structure 6 slides to the slideway 3 through the wharf slideway 8a. Thereafter, the console 4d controls the drain valves 2a and the air valves 2c to open, and compressed air prestored in the air tanks 4e is pumped into the air valves 2c via the compressed air pipelines 4f. The ballast water is discharged, the platform device upwardly floats, and the to-be-carried structure 6 drops on the slideway 3. The console 4d controls the drain valves 2a and the air valves 2c to close, the heights of the rest piers 1a are adjusted, and the to-be-carried structure 6 drops on the rest piers 1a.

Figure 18:
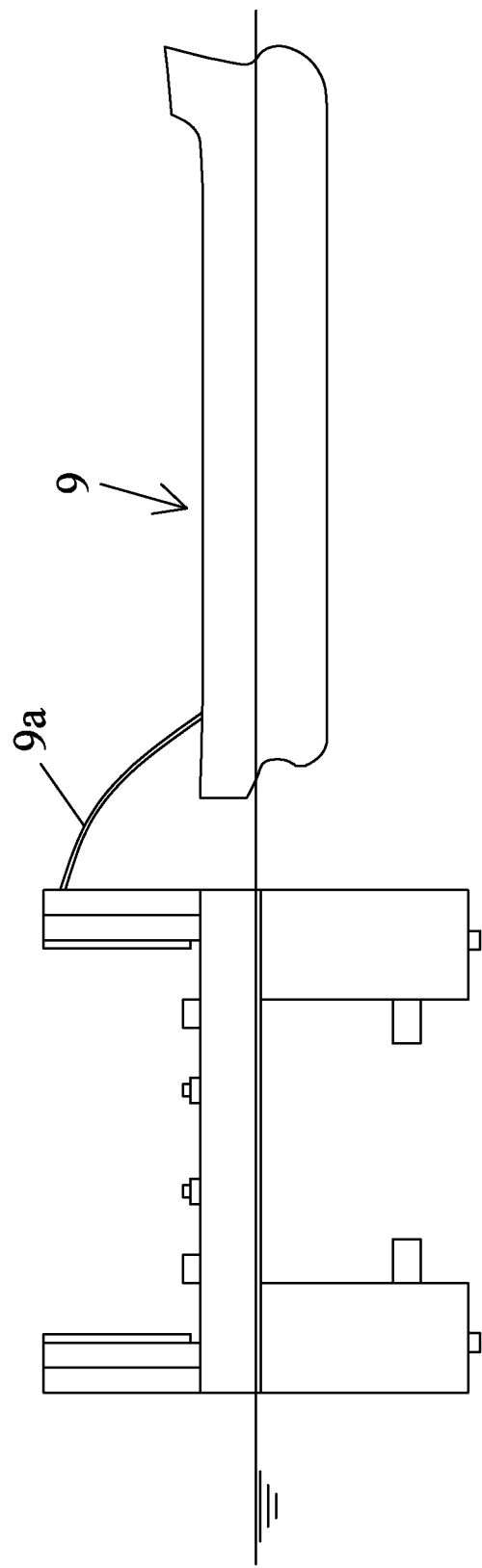
FIG. 18 is an aerating state diagram of a floating and mobile carrying platform device of the disclosure.

FIG. 18 illustrates a charging state of a floating and mobile carrying platform device. The inflation valve 4g is opened under the control of the console 4d, and the air tanks 4e are charged through an on-shore compressed air source. Optionally, the air tanks 4e are temporarily charged through a charging pipe 9a of a working ship 9.

Figure 19:
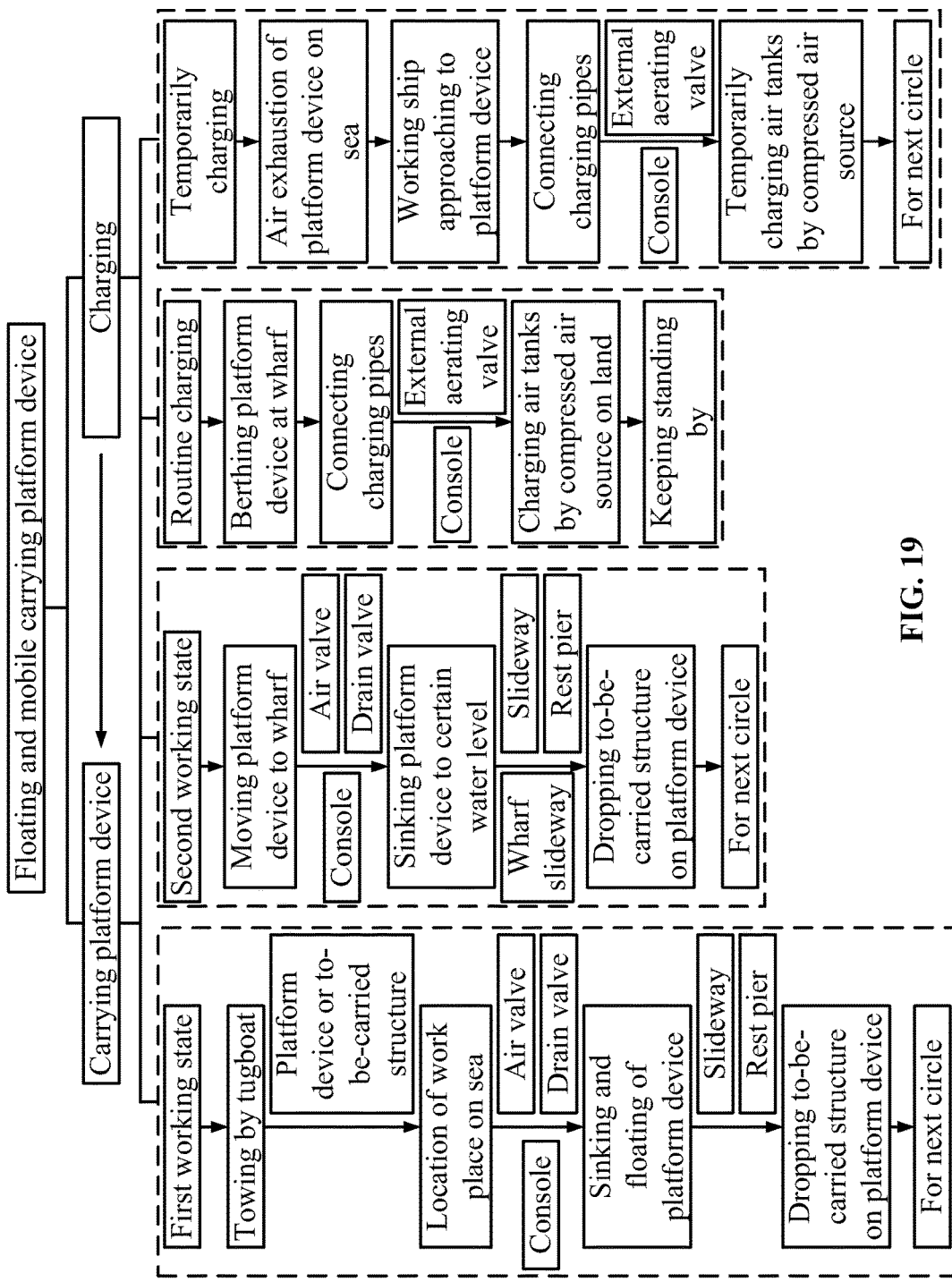
FIG. 19 is an operation process chart of a floating and mobile carrying platform device of the disclosure.

FIG. 19 illustrates an operation process chart of the floating and mobile carrying platform device of the disclosure.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A floating and mobile carrying platform device, comprising:
   a load-bearing deck trunk comprising an upper surface and a lower surface;
   a semi-submersible tower disposed on the upper surface of the load-bearing deck trunk;
   a buoyancy pier connected to the lower surface of the load-bearing deck trunk;
   rest piers disposed on the upper surface of the load-bearing deck trunk;
   a console disposed in the semi-submersible tower;
   a slideway disposed on the upper surface of the load-bearing deck trunk; and
   a connection member disposed between the load-bearing deck trunk and the semi-submersible tower;
   wherein:
   the load-bearing deck trunk adopts a box structure, and the box structure comprises a top plate, a bottom plate, side plates, a plurality of cross rib plates, and vent holes; each of the plurality of cross rib plates comprises a lightening hole; the plurality of cross rib plates is disposed between the top plate and the bottom plate to support the top plate; the vent holes are disposed at joints of every two adjacent cross rib plates and pass through the top plate and bottom plate; or, the load-bearing deck trunk adopts a grillage structure comprising a top plate and lattice trusses adapted to support the top plate;

the top plate is equipped with a water hole; the rest piers are disposed on the top plate, and are located at cross points of the cross rib plates or at cross points of grids of the lattice trusses;

the buoyancy pier is connected to the lower surface of the load-bearing deck trunk, and comprises a stabilizer fin, a drain valve and an air valve; the stabilizer fin is disposed on a side wall of the buoyancy pier; a cross section of the buoyancy pier is wing-shaped or shuffle-shaped;

the semi-submersible tower is disposed on the upper surface of the load-bearing deck trunk, and comprises an inflation valve, a cabin door, a ladder, a safety deck, and an air tank; the ladder connects the cabin door and the safety deck; and the console and the air tank are disposed on the safety deck, and the console is configured to control the drain valve, the air valve, and the inflation valve; and the air tank is connected to the air valve and the inflation valve via a compressed air pipeline.

2. The device of claim 1, wherein the connection member is of a rigid pipe structure, and a cross section thereof is circular or square.

3. The device of claim 1, wherein the connection member is of a flexible stay rope structure, and is disposed between the load-bearing deck trunk, the semi-submersible tower and the rest piers.

4. A method for using the floating and mobile carrying platform device of claim 1, the method comprising:
1) towing the platform device or a load to an operating location;
2) opening, under the control of the console, the drain valve and air valve, and allowing the platform device to sink to a certain water level;
3) closing, under the control of the console, the drain valve and air valve; continuing towing the platform device right below the load or towing the load right above the platform device;
4) opening, under the control of the console, the drain valve and air valve, and pumping compressed air prestored in the air tank into the air valve via the compressed air pipeline to discharge ballast water;
5) allowing the platform device to float upwards, and dropping the load on the slideway of the platform device; and
6) closing, under the control of the console, the drain valve and the air valve, and adjusting a height of the rest piers to allow the load to drop on the rest piers.

5. The method of claim 4, further comprising charging the air tank in need thereof, wherein the charging the air tank comprises: opening, under the control of the console, an inflation valve of the semi-submersible tower, and then charging the air tank via a compressed air source or a charging pipe of a working ship.

6. A method for using the floating and mobile carrying platform device of claim 1, the method comprising:
1) docking the platform device beside a wharf having a slideway;
2) opening, under the control of the console, the drain valve and air valve, and adjusting the platform device to be in the same height as the slideway of the wharf;
3) closing, under the control of the console, the drain valve and air valve; allowing a load to slide on the slideway of the platform device via the slideway of the wharf;
4) opening, under the control of the console, the drain valve and air valve, and pumping compressed air prestored in the air tank into the air valve via the compressed air pipeline to discharge ballast water;
5) allowing the platform device to float upwards, and dropping the load on the slideway of the platform device; and
6) closing, under the control of the console, the drain valve and the air valve, and adjusting a height of the rest piers to allow the load to drop on the rest piers.

7. The method of claim 6, further comprising charging the air tank in need thereof, wherein the charging the air tank comprises: opening, under the control of the console, an inflation valve of the semi-submersible tower, and then charging the air tank via a compressed air source or a charging pipe of a working ship.

* * * * *